United States Patent
Chen et al.

(10) Patent No.: US 7,360,042 B2
(45) Date of Patent: Apr. 15, 2008

(54) DETERMINING WHEN TO EVICT UNUSED ITEMS FROM STORAGE

(75) Inventors: Boaz Chen, Redmond, WA (US); Liviu Asnash, Bellevue, WA (US); Shahar Prish, Redmond, WA (US); Silvio Susskind, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 249 days.

(21) Appl. No.: 11/019,102

(22) Filed: Dec. 20, 2004

(65) Prior Publication Data

US 2006/0136673 A1 Jun. 22, 2006

(51) Int. Cl.
*G06F 12/00* (2006.01)
*G06F 13/00* (2006.01)
*G06F 13/28* (2006.01)
*G06F 9/34* (2006.01)

(52) U.S. Cl. .................. 711/159; 711/133; 711/136; 711/158

(58) Field of Classification Search ................ 711/134, 711/136, 139, 158, 159
See application file for complete search history.

(56) References Cited

U.S. PATENT DOCUMENTS

| | | | | |
|---|---|---|---|---|
| 6,745,289 B2* | 6/2004 | Gruner et al. | ............. | 711/119 |
| 6,834,329 B2* | 12/2004 | Sasaki et al. | ............... | 711/134 |
| 6,910,106 B2* | 6/2005 | Sechrest et al. | ............ | 711/136 |
| 2003/0014603 A1* | 1/2003 | Sasaki et al. | ............... | 711/158 |
| 2004/0068627 A1* | 4/2004 | Sechrest et al. | ............ | 711/158 |
| 2005/0235119 A1* | 10/2005 | Sechrest et al. | ............ | 711/158 |
| 2006/0064549 A1* | 3/2006 | Wintergerst | ................. | 711/134 |
| 2006/0136673 A1* | 6/2006 | Chen et al. | ................. | 711/133 |

\* cited by examiner

*Primary Examiner*—Donald Sparks
*Assistant Examiner*—Fred W Detschel
(74) *Attorney, Agent, or Firm*—Merchant & Gould P.C.

(57) ABSTRACT

Items that are in use are maintained in a used item store. Items that are no longer in use are placed in an unused items store. When an item that is not currently in use is requested again, an attempt is made to retrieve the item from the unused item store. Retrieving the item from the unused items store can save a tremendous amount of time since the object does not need to be recalculated again when it is requested. Items may be evicted from the unused item store based on the system resources available. When it has been determined that an item(s) should be evicted, an eviction score is calculated for each unused item. Items are then evicted from the unused item store based on their eviction score. Generally items that are larger in size, took less time to calculate, have not been accessed as frequently, and have not been referenced recently, are the first ones to be evicted from unused items store.

18 Claims, 6 Drawing Sheets

DETERMINING WHEN TO EVICT UNUSED ITEMS FROM STORAGE

BACKGROUND OF THE INVENTION

Many applications frequently request to access the same data multiple times. To improve the performance of these applications, developers have come up with many different optimizations. One of these optimizations is to store the most recently and/or frequently used items in a cache. Generally, a cache is a temporary storage area that is used to speed up repeated access by the application to the same data. Caches are typically created in a memory that may be more quickly accessed then where the data is permanently stored. For instance, a cache may be created in RAM instead of on a hard drive which takes longer to access. As a cache is limited in size, data is not stored in the cache permanently. Once the data is removed from the cache, access to the data is slower.

One example of a cache is a web browser's cache. The browser cache stores content associated with a user's recently accessed web pages on their hard drive. This helps to speed up requests for the same web pages since this web page data does not need to be retrieved again providing the web page has not changed since the last access. Similarly, many web servers include caches for frequently accessed items. For example, a web server may cache the most recent and/or frequently accessed content such that the server does not need to retrieve the content from another location each time the content is requested.

SUMMARY OF THE INVENTION

Embodiments of the present invention are related to a method and system for managing used and unused items.

According to one aspect of the invention, items that are in use are kept in a used item store. When an item is no longer in use, or becomes stale, the item is moved from the used items store and placed in an unused items store. When an item that is not currently in use is requested again, an attempt is made to retrieve the item from the unused item store. Retrieving the item from the unused items store can save a tremendous amount of time since the object does not need to be recreated again when it is requested.

According to another aspect of the invention, items may be evicted from the unused item store based on the system resources available. When it has been determined that at least one item should be evicted, an eviction score is calculated for each unused item. Items are then evicted from the unused item store based on their eviction score. Generally items that are larger in size, took less time to calculate, have not been accessed as frequently, and have not been referenced recently, are the first ones to be evicted from unused items store.

According to still yet another aspect of the invention a desired memory size for the size of the unused item store is calculated. When the desired memory size is smaller than the unused item size then items are evicted from the unused items until the desired memory size is greater than or equal to the size of the unused items.

DETAILED DESCRIPTION OF THE PREFERRED EMBODIMENT

Generally, embodiments of the present invention are related to a method and system for managing unused items. Items that are no longer in use may be placed in an unused items store. When an item that is not currently in use is requested again, an attempt is made to retrieve the item from the unused item store. Retrieving the item from the unused items store can save a tremendous amount of time since the object does not need to be recalculated again when it is requested. Items may be evicted from the unused item store based on the system resources available. When it has been determined that an item(s) should be evicted, an eviction score is calculated for each unused item. Items are then evicted from the unused item store based on their eviction score. Generally items that are larger in size, took less time to calculate, have not been accessed as frequently, and have not been referenced recently, are the first ones to be evicted from unused items store.

Illustrative Unused Items Manager System

Figure 3:
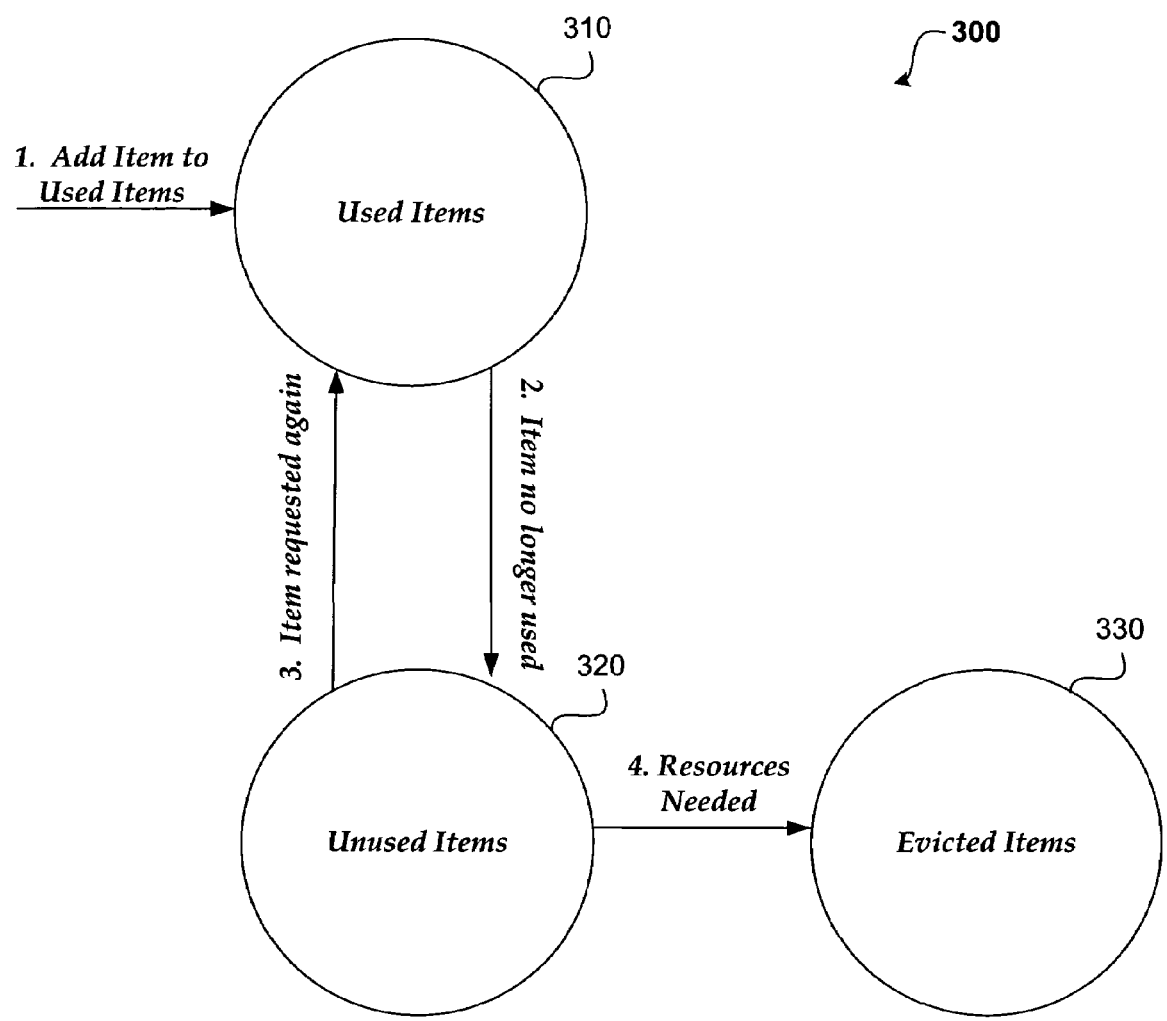
FIG. 3 is a state diagram showing the states of an item.

FIG. 3 is a state diagram showing the states of an item, in accordance with aspects of the invention.

Initially, when an object is created, the object is placed into used items store 310. According to one embodiment, placing the object into the used items store refers to maintaining a reference to the object. Items remain in used items store 310 while they are being used. For example, an item will remain in the used items store until all users have stopped referring to the item.

Once the item is no longer being used, the item is moved from used items store 310 to unused items store 320. Unused items store 320 is a secondary data store for storing items that may be requested and used in the future. Storing the item in an unused items store can save a tremendous amount of time when the object is requested again since the object does not need to be recalculated again when it is requested. Many items stored in the unused items store could have taken a significant time to calculate. For example, the item within the store may be a spreadsheet workbook that took an hour to calculate. By storing the workbook item in the unused items store, the next time it is requested it will not need to be recalculated. This helps to return results much faster to the user.

This is different as compared to a normal cache. In dealing with a normal cache an application doesn't care if an item from the cache is "in use" or not—either because it is used for very short periods of time, or because these items are small in size. While the items are in use their resources are not freed even if they are removed from the cache.

When resources are needed by the system, an item, or items, are removed from unused items store 320. Once the item is evicted, the item needs to be recalculated when it is accessed again. In some embodiments, items may never need to be removed from the unused items store.

Figure 4:
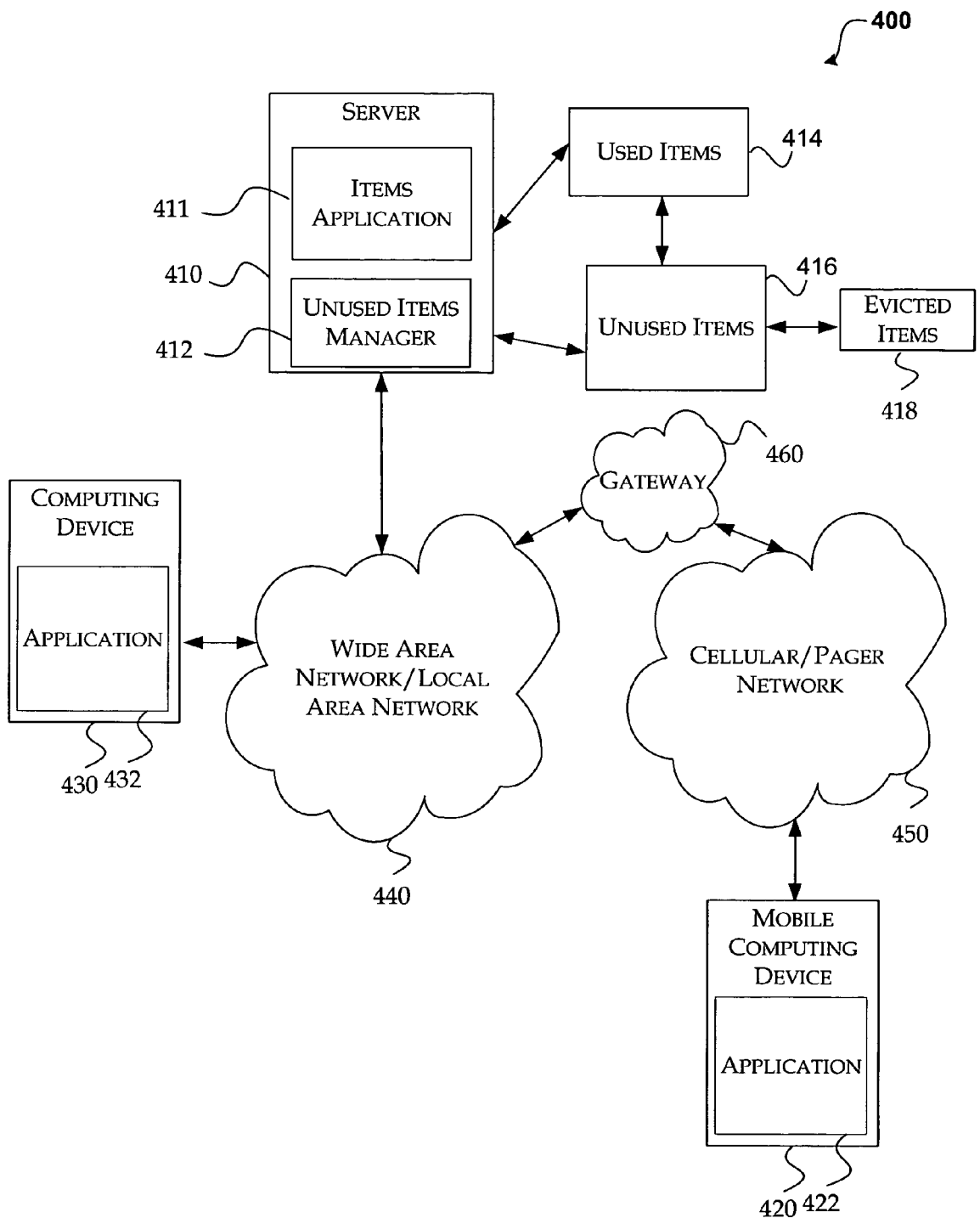
FIG. 4 is a functional block diagram generally illustrating an unused items manager system.

FIG. 4 is a functional block diagram generally illustrating an unused items manager system 400, in accordance with aspects of the invention. Server 410 and computing device 430 are computing devices such as the one described in conjunction with FIG. 1 and mobile device 420 is a mobile computing device such as the one described in conjunction with FIG. 2.

Server 410 is configured to run unused items manager 412. Items application 411 is configured to create items and to interact with applications 422 and 432 on clients 420 and 430. The data may be transmitted over a wide area network (WAN)/local area network (LAN) 440.

A user may use items on devices 420 and/or 432. Application 422 and 432 residing on mobile device 420 and computing device 430 is configured to interact with items application 411. According to one embodiment, items application 411 is a spreadsheet application that interacts with applications 422 and 432. Applications 422 and 432 and items application 411 may communicate using any one of several client-server protocols.

When a user, such as a user using application 432, requests access to an item, unused item manager 412 determines whether the item is currently in use. When the item is currently in use, the item is accessed in the used items store. When the item is not currently in use, the item is moved from unused items store 416 to used items store 414 and then accessed. As discussed above, retrieving the item in the unused items data store is typically faster than accessing the item at its permanent data store or having to recalculate the item. The used and unused items data stores may be any type of memory. For example, the stores may be volatile or nonvolatile memory.

According to one embodiment, the items relate to spreadsheet items that are calculated by items application 411 on server 410. For example, items application 411 may calculate a spreadsheet workbook and then render the workbook to a user's web browser on their device, such as device 420 and device 430.

In the current example, when a user opens a workbook, a workbook file is loaded into memory, external data queries are run against (remote) databases, and then calculation of all the formulas on that workbook takes place. When these processes take place, memory items that contain the data get created and are stored in used items 414. These items are then used to return the data to the user. These processes are potentially expensive to execute as workbook files can be on a remote server, databases can be busy serving other queries run against them, and the server's CPU can be busy performing other calculations.

As long as the loaded workbooks and their accompanying memory items are in use they are kept in used items 414 further access to them remains fast.

Each item stored in used items data store 414 includes a usage count that determines when users are accessing an item. Each time the item is accessed, unused items manager 412 increments the counter when the item gets used, and decrements the counter when the item stops getting used. When the usage count reaches zero then no user is accessing the item any longer. At this point, unused items manager 412 removes the item from used items 414 and places the item in unused items data store 416.

If the item is requested again, then the item is removed from unused items 416 and moved to used items 414 where the item is reused. Average usage patterns of the spreadsheet workbooks show that workbooks may not be used by any user for a period of time but will be used again. These times of non-use may be brief and therefore keeping the unused items in memory, instead of immediately releasing them, highly improves the performance of a server and its response time to user requests. Storing the items in the unused items store 416 also saves server 410 from having to recalculate the workbook item.

As discussed, unused Items manager 412 manages removing items from unused items data store 416. This eviction occurs when the system is low on resources. Resources may be low for a number of reasons. For instance, memory may be limited. Whenever system resources are scarce, unused item manager 412 is requested to evict items until a determined amount of memory is reclaimed. The unused items manager determines which unused items should be evicted and which items should stay in the unused items data store. Generally, the eviction decision considers the following factors: the item's size, the time it took to create the object, the popularity of the object (i.e. how many times it has been accessed), and the last time the object was referenced.

Server 410 runs a background process that periodically polls and checks whether system resources are needed (See discussion below). Generally, an optimal size for the unused items store 416 is calculated that is based on the currently available resources of the system. When resources are needed, unused item manager 312 is requested to release the proper amount of memory by invoking an eviction process that removes the objects from the unused items store.

The eviction policy attempts to determine the likelihood that an item is going to be referenced again. In general, items which are bigger, took less time to build, have been less popular, and have not been referenced recently, are the first ones to be evicted from unused items store. The eviction process checks each item in the unused item data store, and calculates an eviction score for each object. According to one embodiment, the eviction score is calculated using the following formula:

$$(Size * LastReference)/(CreationTime * Popularity);$$

where size is the size of the item; LastReference is the time span since the last time the item has been used; CreationTime is the time it took to create the item; and popularity is how many times the item has been accessed. This eviction formula may be modified based on the item that are being managed. For example, a weighting factor may be added to appropriately weight one of the parameters. Once the eviction scores have been calculated for each item, unused items manager 412 sorts the item based on their score. Unused items manager 412 evicts the item with the highest score first, until enough items have been evicted to release the determined amount of memory.

Unused items manager 412 is also configured to remove stale items. Stale items are items that are not usable for any new incoming requests. The item may become stale in the used items store or the unused items store. When the object becomes stale in the used items store, then it is not moved to the unused items store when it is not used anymore. When the object becomes stale in the unused items store then the stale objects are evicted first.

Cellular/pager network 450 is a network responsible for delivering messages to and receiving messages from wireless devices. The cellular/pager network 450 may include both wireless and wired components. For example, cellular/pager network may include a cellular tower that is linked to a wired telephone network. Typically, the cellular tower carries communication to and from cell phones, long-distance communication links, and the like.

Gateway 460 routes messages between cellular/pager network 450 and WAN/LAN 440. For example, a computer user may send a message that is addressed to a cellular phone. Gateway 460 provides a means for transporting the message from the WAN/LAN 440 to cellular/pager network 450. Conversely, a user with a device connected to a cellular network may be browsing the Web. Gateway 460 allows hyperlink text protocol (HTTP) messages to be transferred between WAN/LAN 440 and cellular/pager network 450.

Processes for Managing Unused Items

Figure 5:
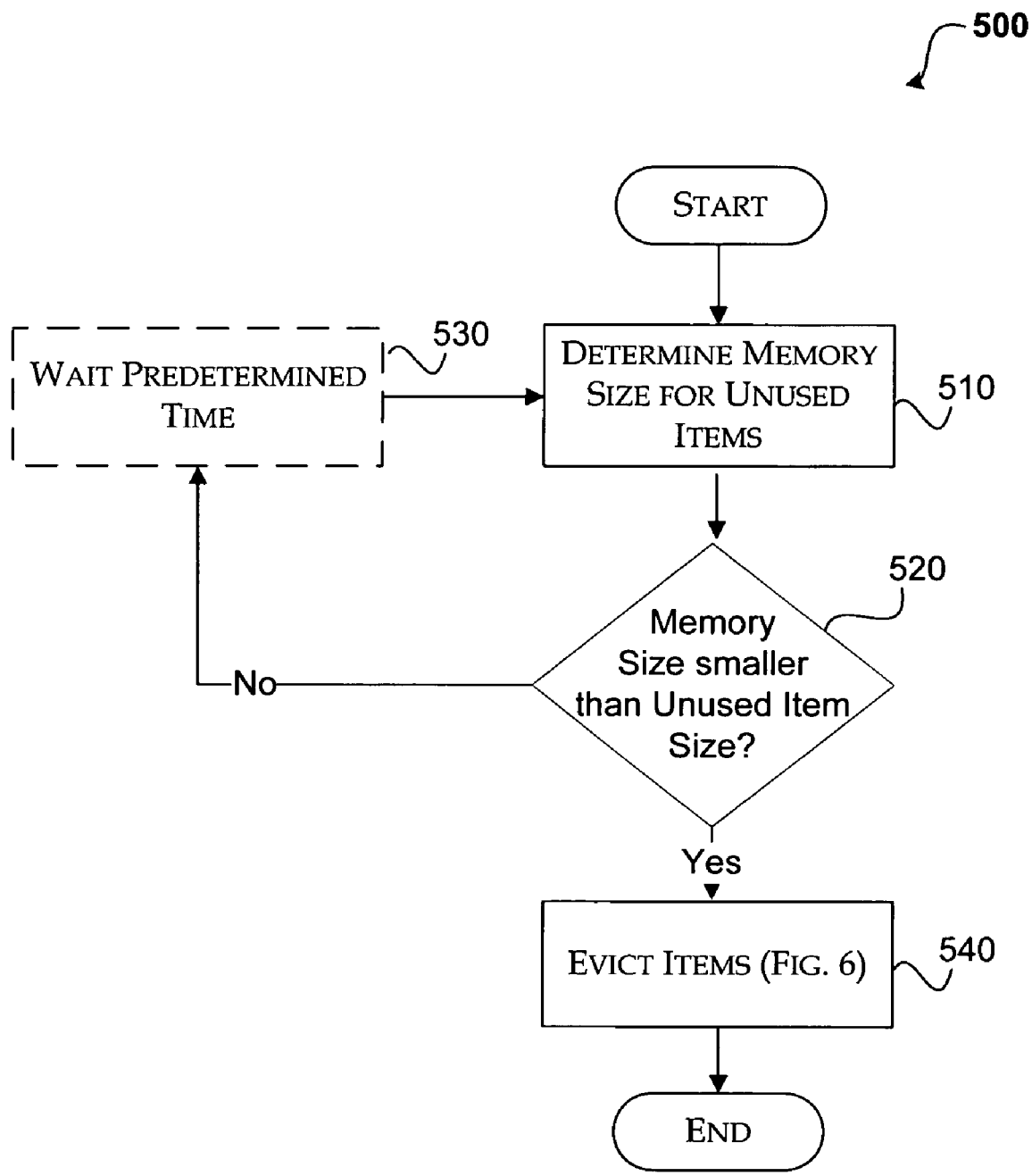
FIG. 5 illustrates an overview of a process for determining when to evict as well as evicting unused items.

FIG. 5 illustrates an overview of a process for determining when to evict as well as evicting unused items, in accordance with aspects of the invention. After a start block the process flows to block 510 where a calculation is performed to determine the desired memory size for the unused items. The calculation is directed at finding an optimal memory size for the unused items such that the system's resources are efficiently utilized. Determining an optimal size for the unused items data store may be determined many different ways.

According to an embodiment of the invention, the following equation is used to determine the optimal size for the unused items store. If (M−VM<Margin) then UIM=0.9*(M−VM+UIM−Margin); where M is the size of the process limit (defined by the system admin, or some other designated user); VM is the virtual memory defined by the size of the unused items (UIM)+the size of the used times (which can include all of the virtual memory used by the process, operating system memory, application's data and cache, etc.; and the margin is typically set approximately between 0 and 5%.

Moving to decision block 520, a determination is made as to whether the calculated memory size is smaller than the current size of the unused items. In other words, do the current unused items take up less memory than the optimal memory size that was calculated at block 510.

When the calculated memory size is not smaller than unused item size, the process moves to block 530. At optional block 530, the process may wait a predetermined period of time before moving to block 510 to begin the process again. The waiting time may be set many different ways. For example, the time period may be set based on a fixed interval (e.g. X seconds, X minutes, and the like) or set based on the current load of the system.

When the calculated memory size is smaller than the current unused item size, then the process moves to block 540 where items are evicted. Enough items are evicted such that after the eviction process, the unused item size is smaller than the calculated memory size (See FIG. 6 and related discussion).

The process then moves to an end block and returns to processing other actions.

Figure 6:
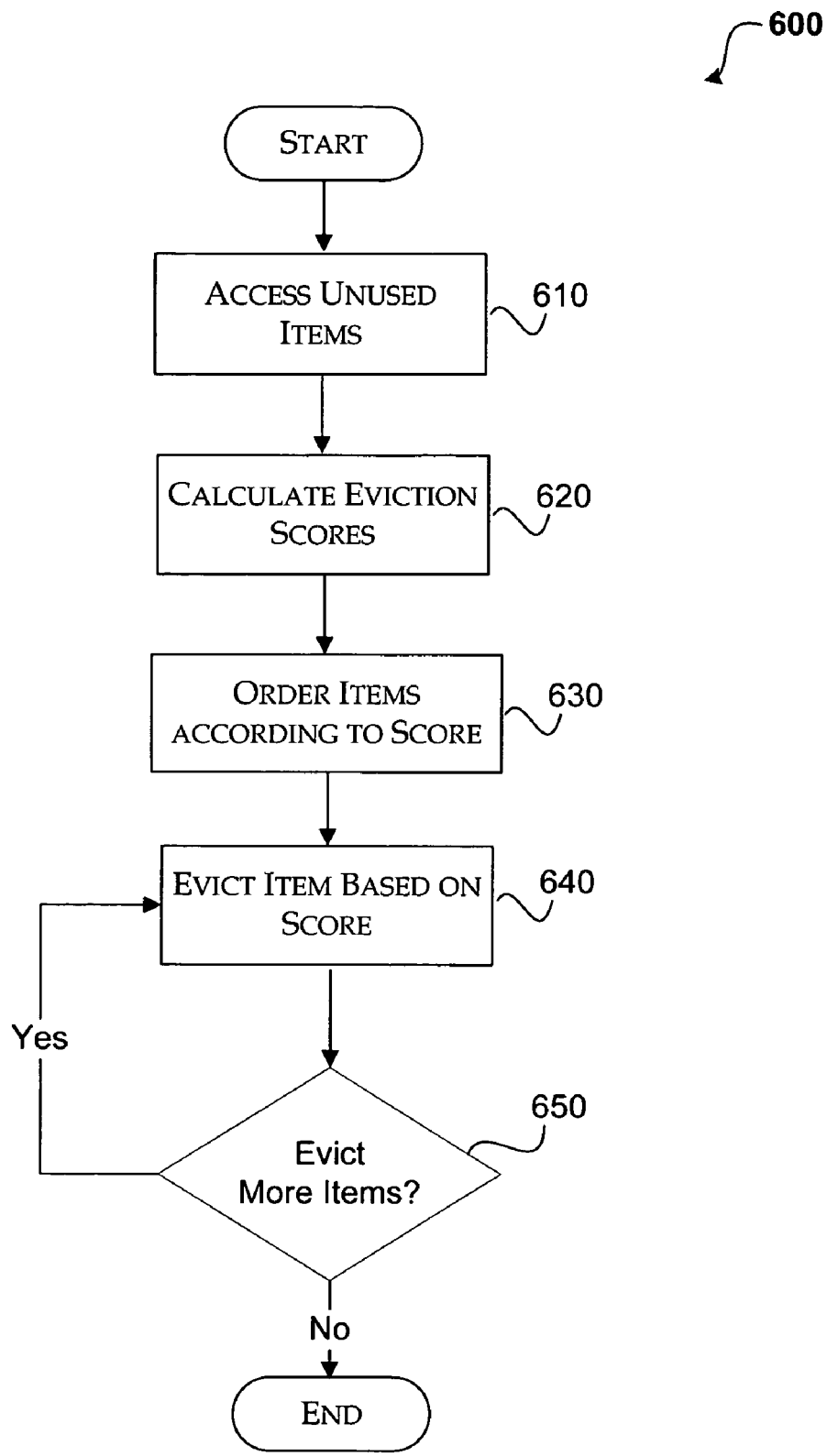
FIG. 6 illustrates a process for determining which items to evict, in accordance with aspects of the invention.

FIG. 6 illustrates a process for determining which items to evict, in accordance with aspects of the invention. After a start block, the process moves to block 610 where the unused items are accessed.

Moving to block 620, an eviction score for each unused item is calculated. As discussed above, according to one embodiment, the eviction score is calculated using the following formula:

$$(Size*LastReference)/(CreationTime*Popularity).$$

In general, items which are bigger, took less time to build, have been less popular, and have not been referenced recently, receive the highest score.

Flowing to block 630, the items are ordered according to their eviction scores. According to one embodiment, the items are ordered from largest to smallest.

Moving to block 640, an item is evicted from the unused items based on its score. According to one embodiment, the item having the highest score is evicted.

At decision block 650, a determination is made as to whether to evict more items. The determination is based on whether the last evicted item made the size of the unused items smaller than the optimal memory size as was calculated in FIG. 5.

When at least one more item is to be evicted, the process returns to block 640. When no more items are to be evicted, the process moves to an end block and returns to processing other actions.

Illustrative Operating Environment

Figure 1:
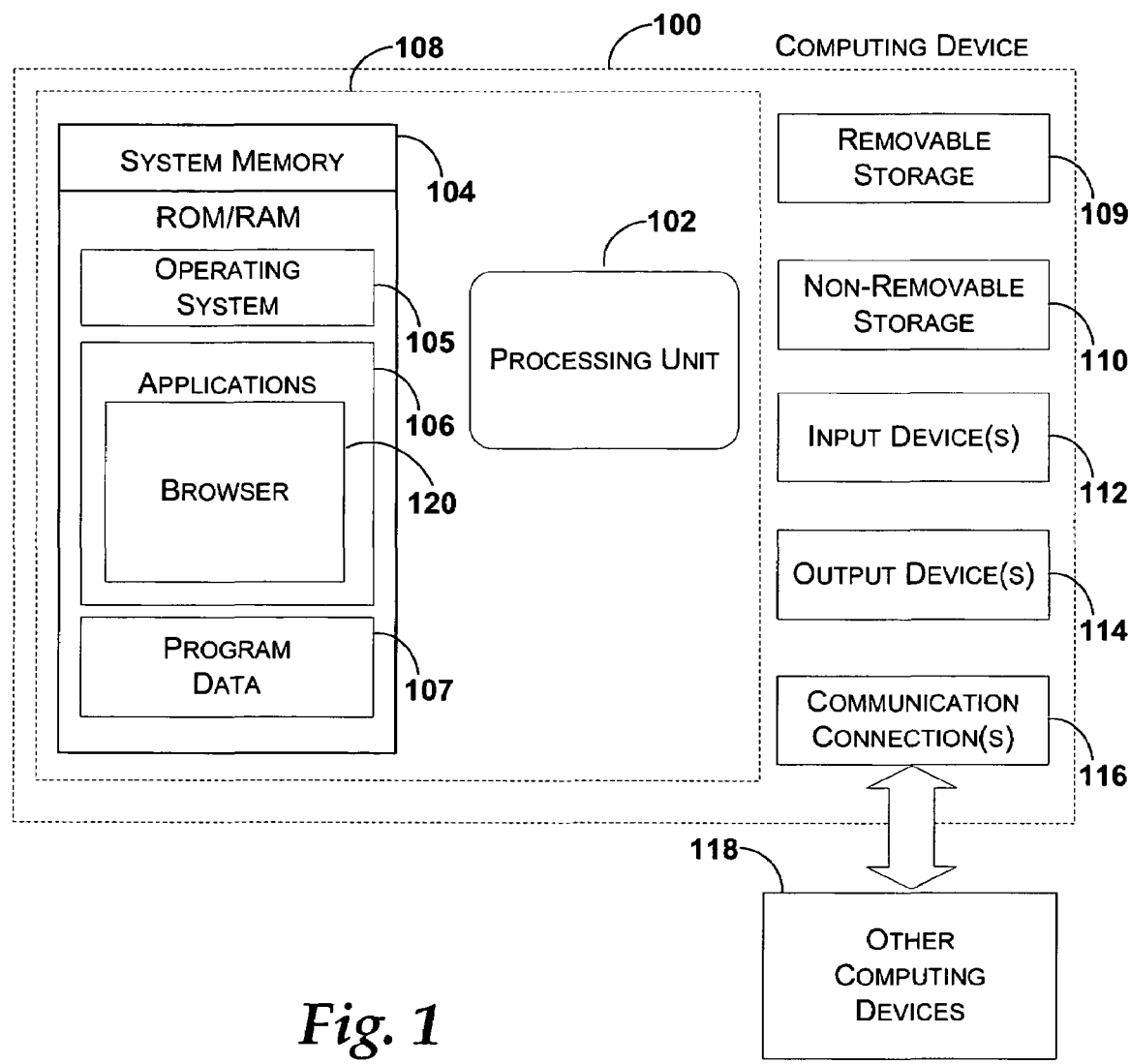
FIGS. 1 and 2 illustrate an exemplary computing devices that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may be a browser application 120 that interacts with a spreadsheet server. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
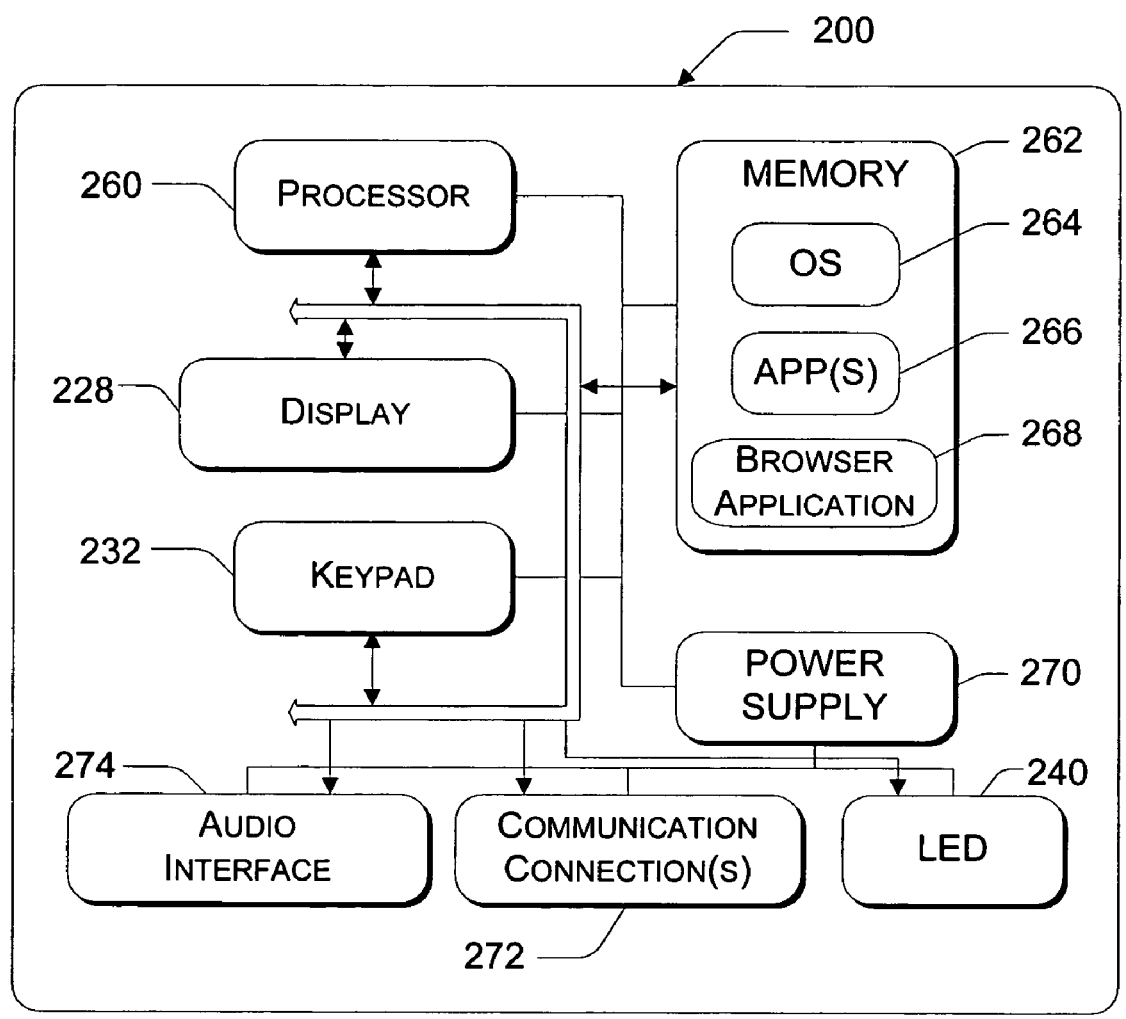

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. Browser application 268 resides on mobile computing device 200 and is programmed to interact with a spreadsheet server. Mobile computing device 200 also includes non-volatile storage within memory 262. Non-volatile storage may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. According to one embodiment, transmissions to and from communications connection 272 are conducted under control of the operating system 264.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing unused items, comprising:
   determining when an item is not currently in use;
   moving the item from a used item store to an unused item store when it is determined that the item is not currently in use;
   moving the item from the unused item store to the used item store when the item is in use again;
   determining when to evict at least one item from the unused item store; wherein determining when to evict the item comprises determining a time duration it took to calculate the item and determining when resources are needed by a system; wherein determining when the resources are needed comprises determining a memory size for the unused items store; and
   evicting the at least one item from the unused item store when determined.

2. The method of claim 1, wherein evicting the at least one item from the unused item store when determined, comprises:
   accessing the unused item store;
   calculating an eviction score for each item within the unused item store; and
   evicting the at least one item from the unused item store based on the eviction scores.

3. The method of claim 2, wherein calculating the eviction score comprises determining the following parameters associated with each item: a size; a time associated with a last reference to the item; a time associated with creating the item; and a number of accesses to the item.

4. The method of claim 1, wherein determining the memory size comprises determining a current size of the unused items, a current size of the used items, and a current size of free memory.

5. The method of claim 1, wherien determining when to evict the at least one item from the unused item store comprises determining a memory size for the unused item store; comparing the current size of the unused item store to the memory size; and when the memory size is smaller than the current size evicting the at least one item from the unused item store.

6. A computer-readable storage medium having computer-executable instructions for managing unused items, the instructions comprising:
   moving an item from a used item store to an unused item store when it is determined that the item is not currently in use;
   moving the item from the unused item store to the used item store when it is determined that the item is in use again;
   determining when to evict an item from the unused item store; wherein determining when to evict the item includes determining a time duration it took to calculate the item and determining when resources are needed by a system; and
   evicting the item from the unused item store when determined; wherein evicting the item from the unused item store when determined, includes: accessing the unused item store; calculating an eviction score for each item within the unused item store; wherein calculating the eviction score comprises determining the following parameters associated with each item: a size; a time associated with a last reference to the item; a time associated with creating the item; and a number of accesses to the item and evicting the item from the unused item store based on the eviction scores.

7. The computer-readable medium of claim 6, wherein determining when to evict the item from the unused item store comprises determining available resources of a system.

8. The computer-readable medium of claim 6, wherein determining when an item is currently in use comprises maintaining a usage count that is associated with the item.

9. The computer-readable medium of claim 7, wherein evicting the item from the unused item store, comprises:
   accessing the unused item store;
   calculating an eviction score for each item within the unused item store;
   selecting an item based on the eviction score; and
   evicting the selected item from the unused item store.

10. The computer-readable medium of claim 9, wherein calculating the eviction score comprises determining: a size; a time associated with a last reference to the item; a time associated with creating the item; and a number of accesses to the item.

11. The computer-readable medium of claim 9, wherein calculating the eviction score comprises applying the following formula to each item in the unused item store: (Size*LastReference)/(CreationTime*Popularity).

12. The computer-readable medium of claim 9, further comprising determining a memory size for the unused items store; wherein determining the memory size includes determining a size of the used items store.

13. A system for managing unused items, comprising:
   a processor and a computer-readable medium;
   an operating environment stored on the computer-readable medium and executing on the processor;
   a used item store including currently used items;
   an unused items store including items that are not currently in use; and
   an application operating under the control of the operating environment and operative to perform actions, including:
   moving an item from the used item store to the unused item store when it is determined that the item is not currently in use;
   moving the item from the unused item store to the used item store when it is determined that the item is in use again;
   determining when to evict at least one of the items from the unused item store; wherein determining when to evict the item includes determining a time duration it took to calculate the item and determining when resources are needed by the system; wherein determining when the resources are needed comprises determining a memory size for the unused items store; and
   evicting the at least one item from the unused item store when determined.

14. The system of claim 13, wherein determining when to evict the item from the unused item store comprises determining available resources of a system and determining when more resources are required by an application.

15. The system of claim 14, wherein evicting the item from the unused item store, comprises:
   accessing the unused item store;
   calculating an eviction score for each item within the unused item store;
   selecting an item based on the eviction score; and
   evicting the selected item from the unused item store.

16. The system of claim 15, wherein calculating the eviction score comprises determining: a size; a time associated with a last reference to the item; a time associated with creating the item; and a number of accesses to the item.

17. The system of claim 15, wherein calculating the eviction score comprises applying the following formula to each item in the unused item store: (Size*LastReference)/(CreationTime*Popularity).

18. The system of claim 13, further comprising determining a memory size for the unused items store.

* * * * *